United States Patent
Hu et al.

(10) Patent No.: US 9,574,888 B1
(45) Date of Patent: Feb. 21, 2017

(54) ROUTE GENERATION BASED ON CONTEXTUAL RISK

(71) Applicant: International Business Machines Corporation, Armonk, NY (US)

(72) Inventors: Guoqiang Hu, Shanghai (CN); Philip L. Schwartz, Newburyport, MA (US); Charles D. Wolfson, Austin, TX (US); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/010,108

(22) Filed: Jan. 29, 2016

(51) Int. Cl.
*G01C 21/34* (2006.01)

(52) U.S. Cl.
CPC ....... *G01C 21/3461* (2013.01); *G01C 21/3484* (2013.01)

(58) Field of Classification Search
CPC .................. G01C 21/3461; G01C 21/3484
See application file for complete search history.

(56) References Cited

U.S. PATENT DOCUMENTS

| | | | |
|---|---|---|---|
| 6,175,803 B1 | 1/2001 | Chowanic et al. | |
| 8,606,512 B1* | 12/2013 | Bogovich | G06Q 40/08 340/995.28 |
| 8,682,699 B2* | 3/2014 | Collins | G06Q 40/08 705/4 |
| 8,738,523 B1 | 5/2014 | Sanchez et al. | |
| 8,805,707 B2* | 8/2014 | Schumann, Jr. | G08G 1/096775 705/35 |
| 9,141,582 B1* | 9/2015 | Brinkmann | G06F 17/00 |
| 2007/0282638 A1* | 12/2007 | Surovy | G06Q 40/02 705/4 |
| 2014/0074402 A1* | 3/2014 | Hassib | G01C 21/3461 701/533 |
| 2014/0257869 A1* | 9/2014 | Binion | G07C 5/00 705/4 |
| 2015/0088550 A1* | 3/2015 | Bowers | G06Q 40/08 705/4 |
| 2015/0260531 A1* | 9/2015 | Ehsani | G01C 21/3484 701/538 |

\* cited by examiner

*Primary Examiner* — Todd Melton
(74) *Attorney, Agent, or Firm* — Mohammed Kashef; Edell, Shapiro & Finnan, LLC

(57) ABSTRACT

Generating routes based on contextual risk includes receiving a destination and generating candidate routes to the destination from a designated location based on roadways available for routes and one or more fixed criteria. A contextual risk associated with each of the candidate routes is determined based on at least dynamic environmental attributes. The candidate routes are displayed on a map together with a representation of the determined contextual risk.

18 Claims, 9 Drawing Sheets

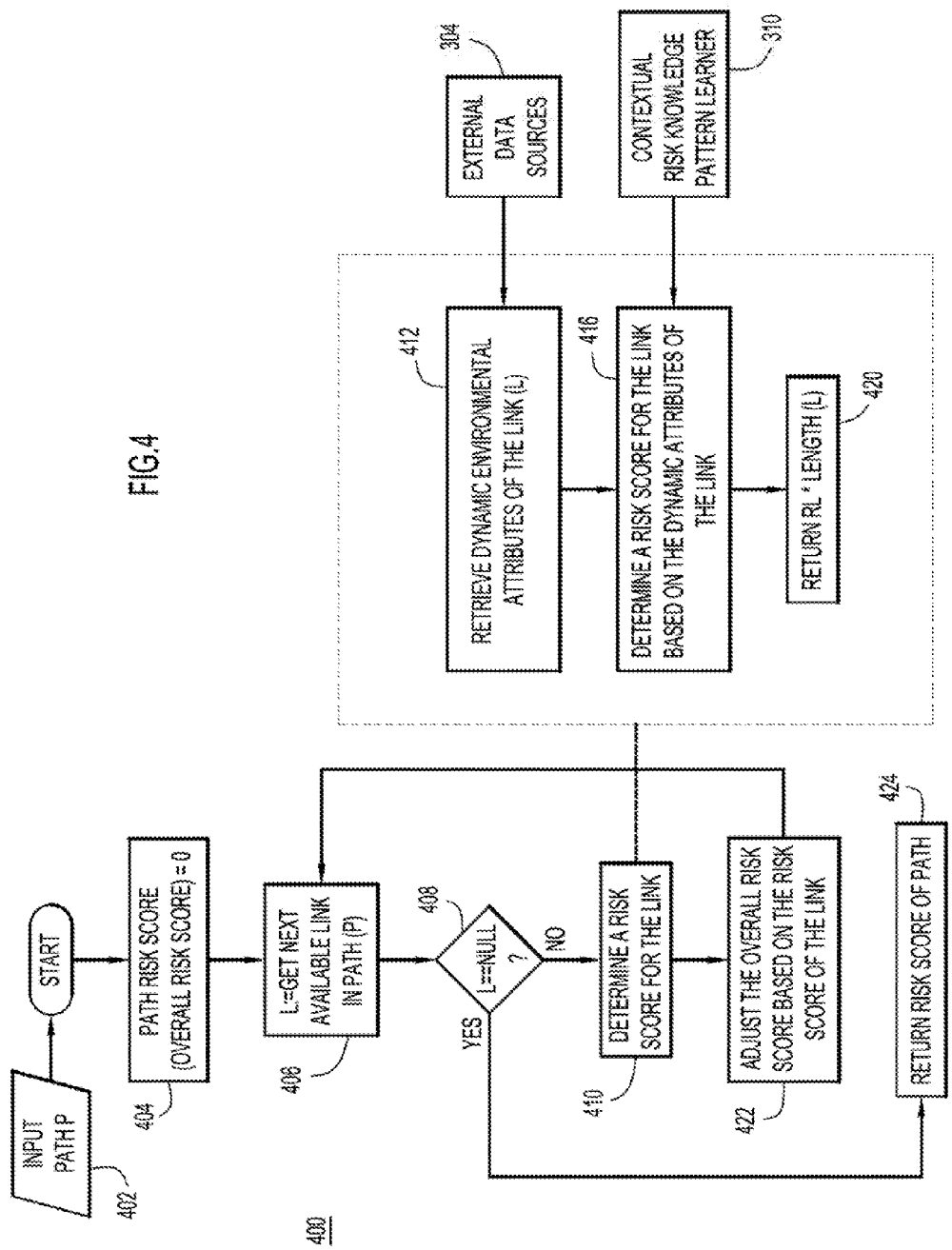

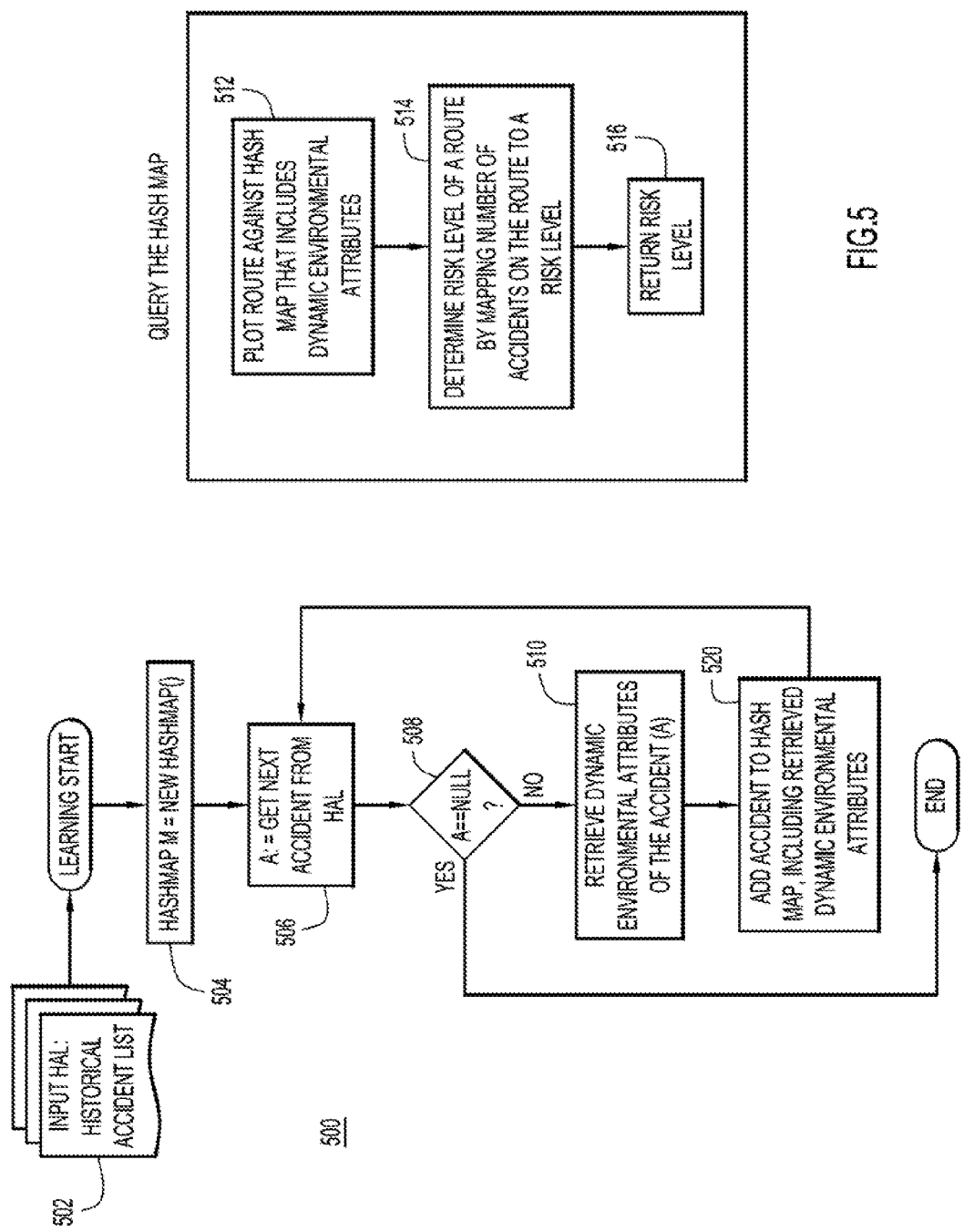

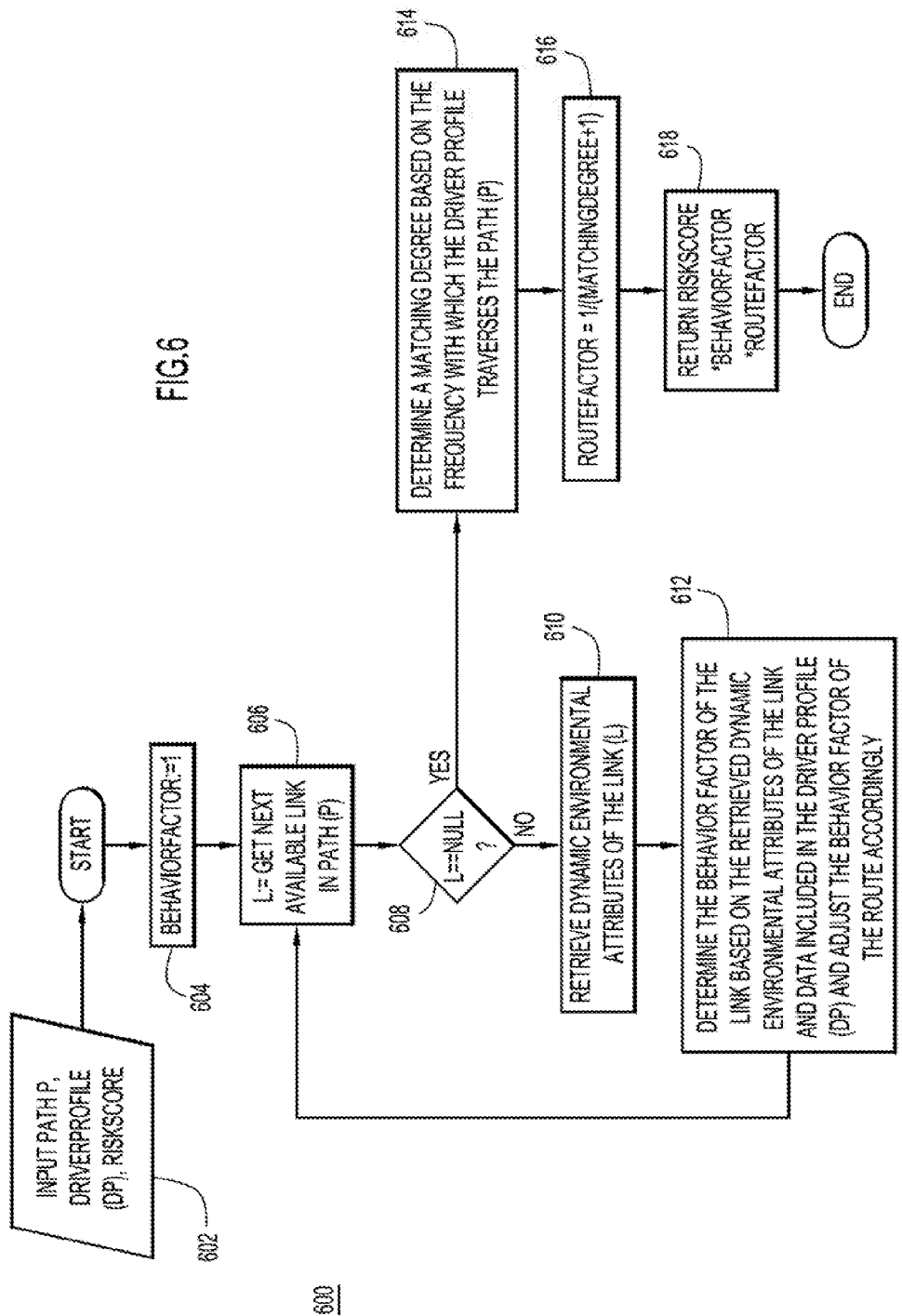

| TRAFFIC | TIME REGION | ROAD TYPE | MILEAGE_TOTAL | OVERSPEED /100 MILES | HASH_BRAKE /100 MILES | ANXIOUS_ACCELERATION /100 MILES |
|---|---|---|---|---|---|---|
| STEADY FLOW | MORNING RUSH HOUR | SECONDARY EXTRA-URBAN ROAD/URBAN PRIMARY | 9185.53 | 0.05 | 0.11 | 0.10 |
| FREE FLOW | DAY | UNKNOWN | 4831.42 | 0.00 | 0.00 | 0.00 |
| FREE FLOW | DAY | HIGHWAY/MOTORWAY | 37247.37 | 0.04 | 0.03 | 0.05 |
| FREE FLOW | DAY | MAIN EXTRA-URBAN ROAD/URBAN HIGHWAY | 3050832 | 0.03 | 0.08 | 0.07 |
| FREE FLOW | DAY | SECONDARY EXTRA-URBAN ROAD/URBAN PRIMARY | 4687445 | 0.29 | 0.51 | 0.17 |
| FREE FLOW | DAY | URBAN-ROAD | 69683.09 | 1.70 | 1.43 | 0.98 |
| FREE FLOW | DAY | OTHERS/URBAN PATH OR ALLEY | 5260218 | 2.23 | 1.35 | 4.65 |
| FREE FLOW | NIGHT | UNKNOWN | 1377.08 | 0.00 | 0.00 | 0.00 |
| FREE FLOW | NIGHT | HIGHWAY/MOTORWAY | 1013832 | 0.04 | 0.03 | 0.04 |
| FREE FLOW | NIGHT | MAIN EXTRA-URBAN ROAD/URBAN HIGHWAY | 1063317 | 0.13 | 0.18 | 0.19 |
| FREE FLOW | NIGHT | SECONDARY EXTRA-URBAN ROAD/URBAN PRIMARY | 3635.51 | 0.18 | 0.18 | 0.28 |
| FREE FLOW | NIGHT | URBAN-ROAD | 15790.94 | 1.19 | 0.65 | 1.01 |
| FREE FLOW | NIGHT | OTHERS/URBAN PATH OR ALLEY | 29079.36 | 2.54 | 2.66 | 1.41 |
| FREE FLOW | MORNING RUSH HOUR | UNKNOWN | 1174.96 | 0.00 | 0.00 | 0.00 |
| FREE FLOW | MORNING RUSH HOUR | HIGHWAY/MOTORWAY | 215105.99 | 0.06 | 0.07 | 0.08 |
| FREE FLOW | MORNING RUSH HOUR | MAIN EXTRA-URBAN ROAD/URBAN HIGHWAY | 10935.05 | 0.00 | 0.00 | 0.00 |
| FREE FLOW | MORNING RUSH HOUR | SECONDARY EXTRA-URBAN ROAD/URBAN PRIMARY | 23763.70 | 0.25 | 0.11 | 0.25 |
| FREE FLOW | MORNING RUSH HOUR | URBAN-ROAD | 26243.49 | 2.02 | 1.14 | 1.03 |
| FREE FLOW | MORNING RUSH HOUR | OTHERS/URBAN PATH OR ALLEY | 12460.06 | 3.30 | 2.73 | 2.01 |
| FREE FLOW | MORNING RUSH HOUR | MAIN EXTRA-URBAN ROAD/URBAN HIGHWAY | 17884.85 | 0.00 | 0.00 | 0.00 |
| FREE FLOW | MORNING RUSH HOUR | SECONDARY EXTRA-URBAN ROAD/URBAN PRIMARY | 6094.78 | 0.08 | 0.08 | 0.14 |
| FREE FLOW | MORNING RUSH HOUR | URBAN-ROAD | 15155.69 | 1.63 | 0.88 | 0.86 |
| FREE FLOW | MORNING RUSH HOUR | OTHERS/URBAN PATH OR ALLEY | 20824.98 | 2.28 | 1.44 | 1.39 |

FIG.7

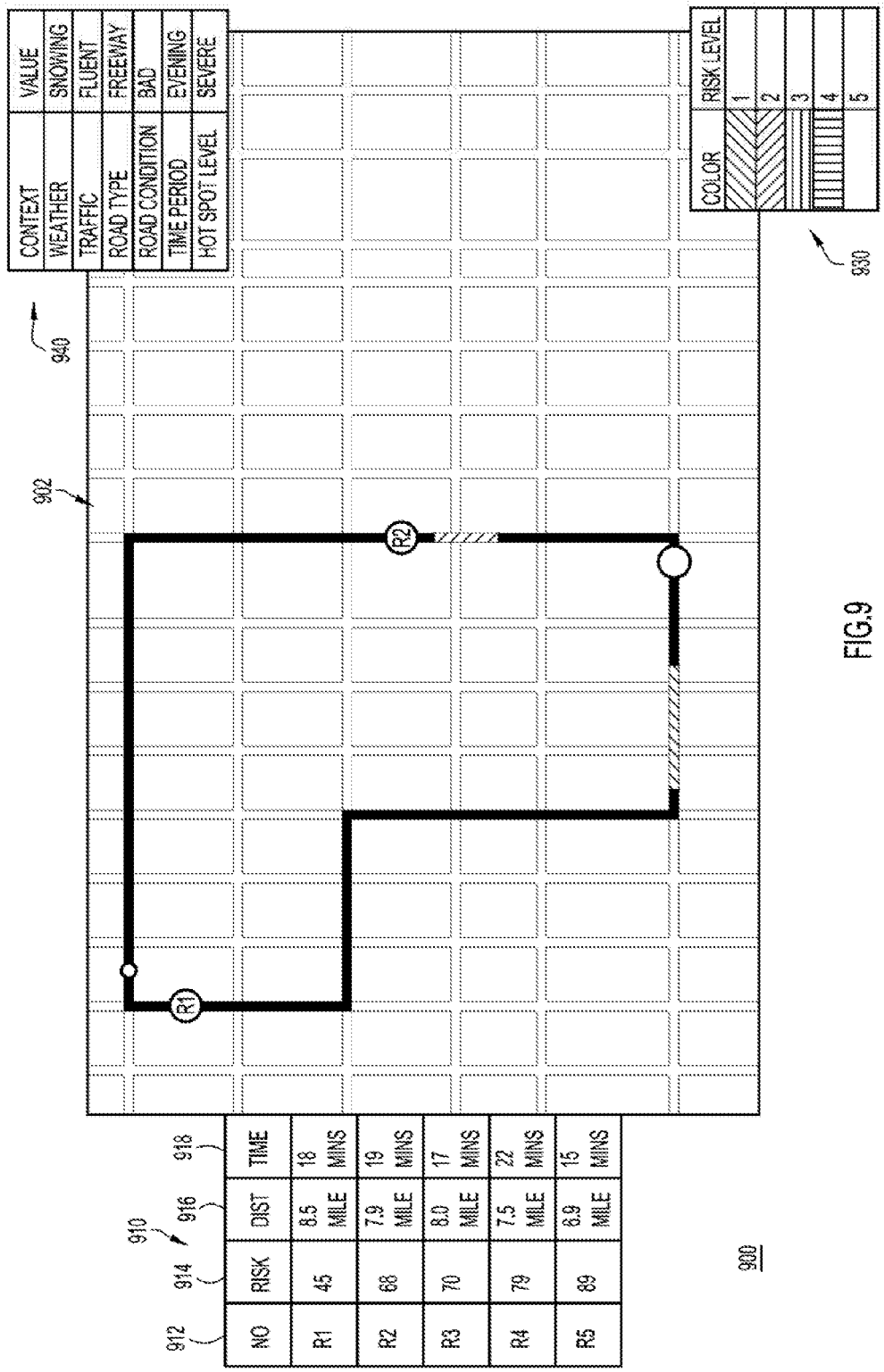

ROUTE GENERATION BASED ON CONTEXTUAL RISK

BACKGROUND

Present invention embodiments relate to navigation systems, and more specifically, to route generation for navigation systems based on contextual risk.

As the Internet of Things (IoT) expands to include all sorts of devices, such as kitchen appliances, fitness trackers, alarm clocks, thermostats, vehicles, etc., an immense amount of data is being generated. For vehicles in particular, multiple device types facilitate the generation of large amounts of telematics data that allow vehicles to be tracked over different routes. Currently, this data is being used to help track and resolve traffic issues. Moreover, car insurance providers are beginning to use telematics data to implement pay-as-you-go programs or otherwise adjust premiums to specific rates for specific drivers. However, sometimes this telematics data fails to provide the adequate information because it is provided without context. For instance, if telematics data indicates that a driver is frequently braking hard, the data does not clarify whether the driver is avoiding accidents that others might have caused (and, thus, for insurance purposes might deserve lower rates) or driving recklessly (and, thus, for insurance purposes might deserve higher rates).

Moreover, regardless of insurance rates, driving safety (e.g., minimizing risk) is a critical factor for many drivers or family members (e.g., parents concerned about their teenage drivers), especially for special groups of drivers like senior citizens, teenagers, new drivers, people with disabilities, etc. As advances in technology pervade automobiles and automobile-related equipment (e.g., rearview cameras, blind spot cameras/alerts, etc.), risks of driving are being reduced. However, driving still has at least some amount risk associated with it.

For example, driving safety is not only related to personal driving habits and behavior patterns, but also to driving environmental context (e.g., weather, traffic, road type, road condition, terrain, day/night time, accident data, crime data), which may be largely dependent of the specific route that a driver will select. In addition, the personal characteristics of individual drivers are not taken into consideration in telematics data. For example, the likelihood of dangerous driving behavior (under a specific context) varies by individual drivers and the risk level for driving on the same route versus a new route should be different. Although many navigation applications now take traffic and customer preference (e.g., minimize or maximize highway driving) into account, none determine risk in order to allow a driver to select the safest, least risky path. Moreover, although some systems generate a route with consideration of statistics risk index on each road segment, these systems do not consider dynamic environmental attributes like traffic, weather, road condition (slippery, icy), accident and crime history in order to determine a contextual risk for a road. Moreover, current systems do not correlate contextual risk with personal driving characteristics (e.g., driver-associated risk) to derive the least risky route for the specific driver at an exact, real-time moment.

SUMMARY

According to one embodiment of the present invention, generating routes based on contextual risk includes receiving a destination and generating candidate routes to the destination from a designated location based on roadways available for routes and one or more fixed criteria. A contextual risk associated with each of the candidate routes is determined based on dynamic environmental attributes. The candidate routes are displayed on a map together with a representation of the determined contextual risk. Generating routes in this manner may reduce accidents and reduce the amount of stressful driving experienced by a driver. These reductions may, in turn, allow an insurer (a driver) to reduce the costs of their insurance based on perceived risk while also allowing the insurance provider to accurately personalize insurance policies on a per-driver basis.

In some of these present invention embodiments, the designated location is a current location of the navigation system and the fixed criteria includes at least one of driving time, distance, maximum highway driving, and minimum highway driving. Consequently, the route-generation may update in real-time and adjust routes for a driver accordingly.

According to other present invention embodiments, determining the contextual risk further includes determining a driver-associated risk based on dynamic driver profiles and determining a path risk based on at least the dynamic environmental attributes. Considering both driver-associated risk and dynamic attributes may enable the route generation to be further personalized for each specific driver. For example, driver profiles indicating an adversity to dark conditions may be kept off unlit roads. In at least some of these present invention embodiments, determining the path risk includes analyzing data retrieved from external data sources relating to at least one of: weather, traffic, road type, road condition, time period, and hot spot level. Additionally or alternatively, the driver profiles may include at least one of the following attributes: contextual driving behavior, frequent route patterns, and historical accident records. Analyzing external data and/or additional driver attributes will serve to increase the efficiency and accuracy of the risk analysis while also increasing the real-time awareness of the risk analysis.

According to yet another present invention embodiment, determining the contextual risk includes splitting each candidate route into two or more route segments. A contextual risk associated with each of the two or more route segments is determined based on at least dynamic environmental attributes of the specific route segments. Then, the contextual risk associated with each of the two or more route segments of each candidate route is aggregated to determine a contextual risk associated with each of the candidate routes. Breaking a route into segments allows a more accurate risk assessment while also ensuring that a small, extremely risky or extremely safe segment does not inordinately affect the risk analysis.

According to still another present invention embodiment, determining the contextual risk further includes weighting the dynamic environmental attributes based on user history. Weighting over time may allow the risk determination to leverage learning techniques implemented throughout the system and fine-tune the risk determination over time.

BRIEF DESCRIPTION OF THE DRAWINGS

Generally, like reference numerals in the various figures are utilized to designate like components.

FIG. 4 is a procedural flow chart of determining contextual risk, according to one present invention embodiment.

FIG. 5 is a procedural flow chart of determining a path risk, according to one present invention embodiment.

FIG. 6 is a procedural flow chart of determining a driver-associated risk, according to one present invention embodiment.

FIG. 7 depicts sample data used to determine a driver profile, according to one present invention embodiment.

FIG. 9 depicts an example user interface for displaying routes including contextual risk on a real-time map, according to a present invention embodiment.

DETAILED DESCRIPTION

Presented herein are techniques for generating candidate driving routes for navigation systems. Generally, candidate routes are generated based on fixed criteria and/or user preferences, such as shortest distance between two locations, shortest time between two locations (based simply on speed limits and distances), or maximum or minimum highway driving between two locations. Then, a contextual risk determination is performed for each of the candidate routes so that the candidate routes may be sorted based on the determined risk, as well as the shortest distance and shortest travel time, and be presented to a user.

The determined risk may account for current conditions, such as weather and traffic, such that the risk for a certain route may vary at different times. Additionally, the risk may be determined and/or altered in view of user history or user preferences ("driver-associated risk") and/or history or attributes of the specific route ("path risk"). Consequently, certain routes may be considered riskier for certain drivers at certain times and safer for these same drivers (or other drivers) at other times. For example, a route with minimal lighting may be determined to be extremely risky between dusk and dawn for a driver with poor vision, especially if the weather is adverse, while the same route may be determined to be minimally risky (e.g., safe) during the day for the same driver. Moreover, the same route may be determined to be minimally risky between dusk and dawn for a driver with excellent vision, provided there is no adverse weather or road conditions on that route. In other words, present invention embodiments may consider dynamic environmental attributes in order to generate candidate routes. Once generated, the routes may be displayed on a map, such as a real-time map together with a representation of the risk associated with that route (e.g., a score, a grade, or color-code).

Figure 1:
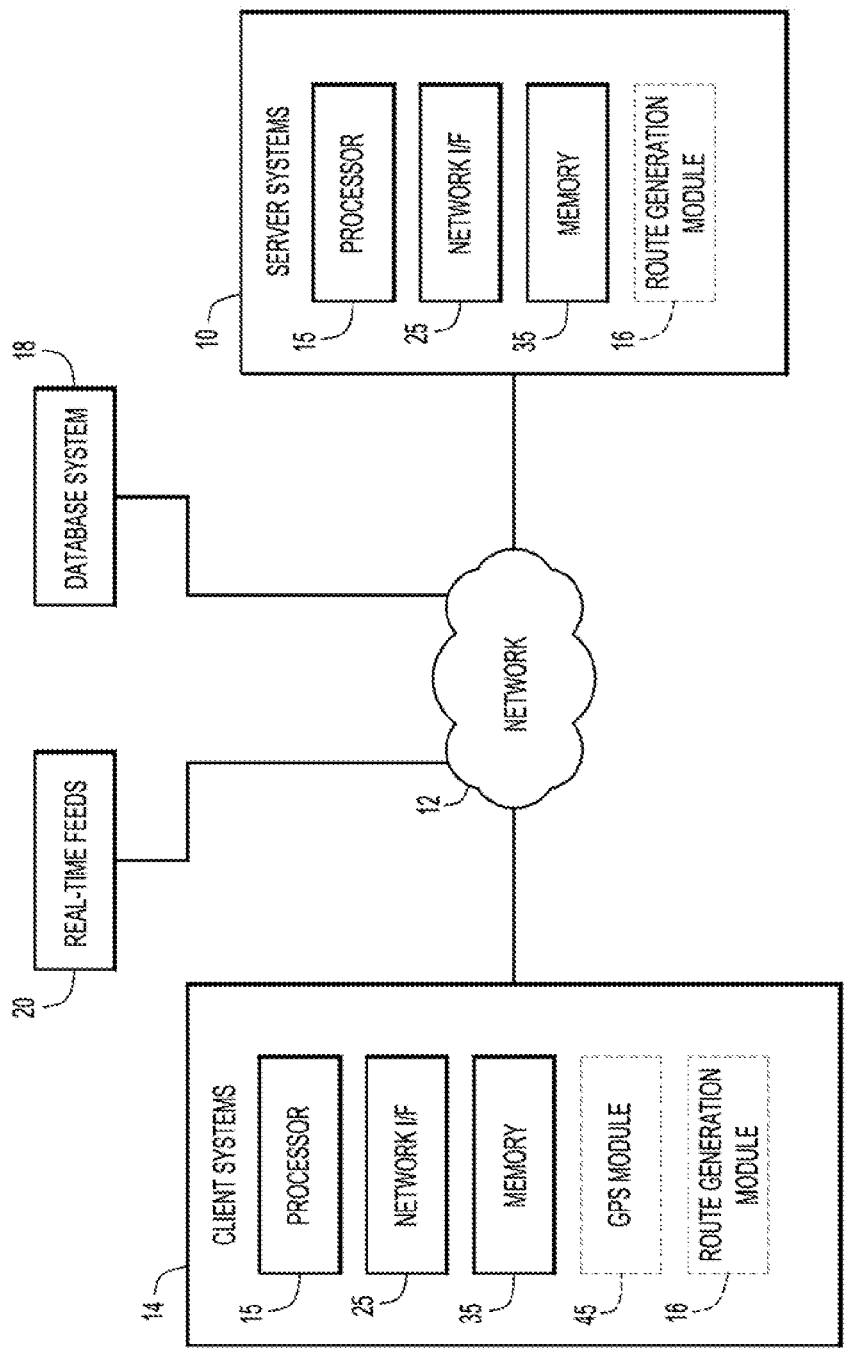
FIG. 1 illustrates an example environment in which the present general inventive concept can be embodied.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

In the present invention embodiment depicted in FIG. 1, the server systems include a route generation module 16 to generate routes based on various inputs, such as the current location of a client system 14. However, in other embodiments, the route generation module 16 may also be disposed, either entirely or partially, on the client systems 14. For example, in some present invention embodiments, routes between two locations (an origin and a destination) may be generated by a server or client system based on fixed criteria (e.g., shortest route) and transferred to server systems 10 in order to determine the risk of each route. However, in other present invention embodiments, the routes may be generated and the risk may be determined entirely on the client systems 14 or the server systems 10.

Client systems 14 may be or include a navigation system that can locate the current position of the client system 14 and generate and display travel routes between a starting point and at least one destination. Accordingly, the client system 14 may include or have access to a global positioning system (GPS) module 45 that may determine the current position of the client system 14. In some present invention embodiments, the client system 14 may comprise a portable electronic device (e.g., a smart phone) or computer (e.g., an automobile computer) and may utilize a GPS module 45. However, in other embodiments, the client system 14 may be a stand-alone device configured to provide any necessary navigation services described herein (e.g., a wristwatch, handheld or portable electronic device, etc.) and may include its own GPS module 45. Still further, the client system 14 may be a computer system with a browser to access web-based navigation services.

A database system 18 may store various information for the analysis performed by the route generation module 16 (e.g., user preferences, route history, user history, etc.). Moreover, the client systems 14 and server systems 10 may be operatively coupled to real-time feeds 20 that may include constant data updates, such as weather or traffic updates. The database system 18 and real-time feeds 20 may be implemented by any conventional or other system, such as a database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems 14 may present a graphical user (e.g., GUI, etc.) or other interface (e.g., command line prompts, menu screens, etc.) to solicit information from users pertaining to the desired information, routes, and analysis, and may provide feedback including analysis results (e.g., a ranking of candidate routes, updates on the risk of particular or current route, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a touch screen display, a keyboard, a mouse, or other input device), and any commercially available and custom software (e.g., server/communications software, route generation module 16, browser/interface software, etc.).

Route generation module 16 may include one or more modules or units to perform the various functions of present invention embodiments described below. Moreover, route generation module 16 may be implemented by any combination of any quantity of software and/or hardware modules or units, and may reside within memory 35 of the server and/or client systems for execution by processor 15. Further description of one embodiment of the route generation module 16 is provided in FIG. 3 and described in further detail below.

Figure 2:
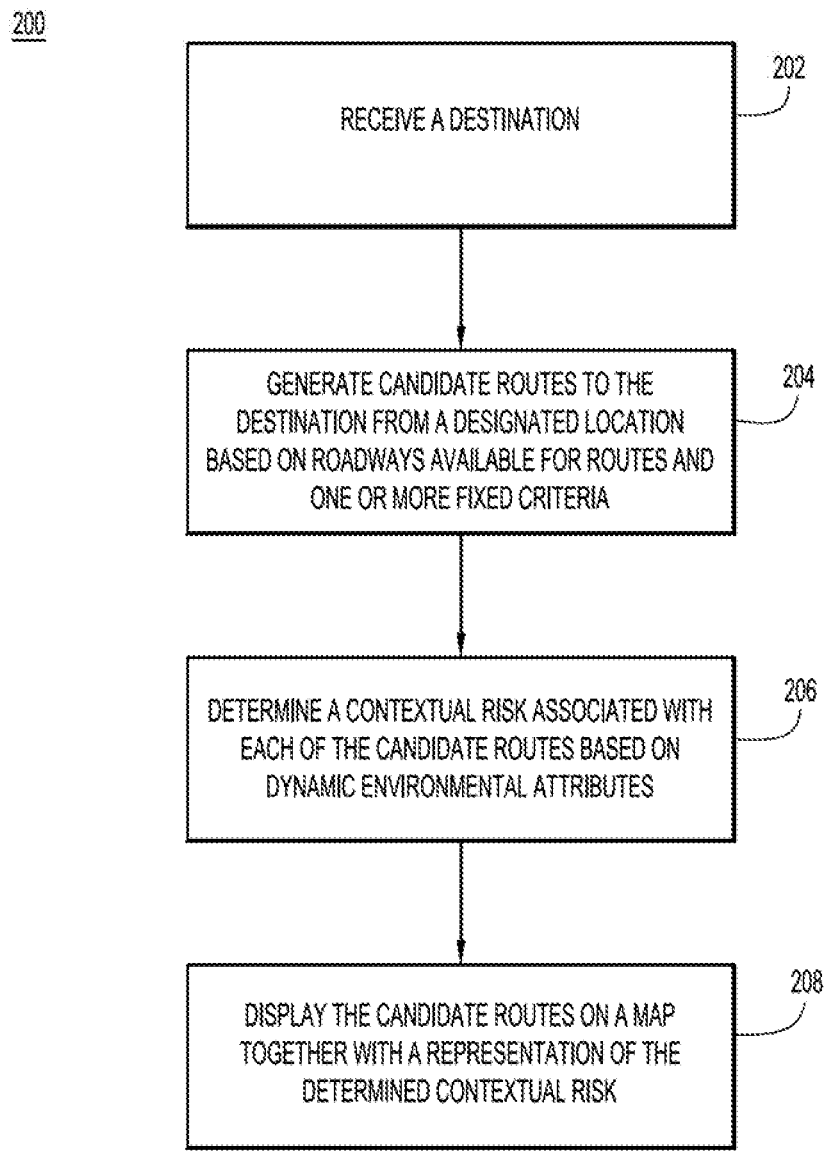
FIG. 2 is a procedural flow chart of generating routes based on contextual risk, according to one present invention embodiment.

With reference now to FIG. 2, procedural flow chart 200 depicts operations (e.g., of route generation module 16) for generating routes. Initially, at step 202, a destination is received. The destination may be a place, street address, intersection, or any other geographical location and may be input in any desirable manner. For example, in some present invention embodiments a destination may be received as a street address while in other present invention embodiments a destination may be received when a location on a displayed map is touched or otherwise contacted. In still further present invention embodiments, a user may perform a keyword search for a destination and select a destination from the search results.

At step 204, candidate routes are generated to the destination from a designated location, such as the current location. In present invention embodiments where routes are generated from the current location of the client system 14 to the destination, the GPS module 45 included in the client system may be utilized to determine a current location. Alternatively, the designated location may be an input location, perhaps to allow a user to plot and consider routes between a non-current location and a destination. For example, if a user is currently at home but wants to consider possible routes between his or her office and a local stadium for that night, the user may input their office address as the designated location and the stadium as the destination.

Once a designated location (e.g., an origin or starting location) and a destination (e.g., an endpoint or ending location) are received or determined, candidate routes from the designated location to the destination are determined based on available roadways and one or more fixed criteria. The available roadways may include any roads in the area that are open to the public for transportation and the fixed criteria may include a variety of traditional navigation methods that consider fixed inputs such as distance, speed limits, number of turns, traffic lights, etc. For example, routes may be determined based on the shortest distance between a designated location and a destination, the shortest amount of driving time between a designated location and a destination or the minimal amount of highway driving required between a designated location and a destination. As mentioned above, in some embodiments, the routes generated at step 204 may be generated at client systems 14, such as by a device or at a server associated with a device. However, in other embodiments, the routes generated at step 204 may be generated at server systems 10 (e.g., by route generation module 16).

At step 206, the contextual risk associated with each of the candidate routes is determined based on dynamic environmental attributes. The dynamic environmental attributes may include, but are not limited to the following: road condition (e.g., deteriorating road, grooved road, freshly paved road, dirt road); road type (e.g., high speed road, road with hairpin turns, toll road, passing lane; no shoulder, etc.); terrain (e.g., mountain/sloped road, hilly road, dirt road, gravel road, etc.); intersection type (e.g., four-way stop, flashing traffic light, sharp turn, etc.); weather (raining, snowing, foggy, icy, sunny, etc.); traffic conditions (e.g., fluid, stop and go, heavy congestion, etc.); time of day (e.g., precise time, dawn, dusk, midday, etc.); road light conditions (e.g., into the sun, sun on the side, no lights on a road, well-lit, partially lit, etc.); historical accident condition (e.g., high risk road segment, low risk road segment; lethal accident history; minor accident history, etc.); number of hot spots (e.g., the number of high risk locations on the road); and historical crime data for the area/neighborhood (e.g.; car thefts, car damage, etc.).

The environmental attributes may be interdependent or otherwise impact each other when risk is determined. For example, a steep or curvy road may be extremely risky in the snow. Similarly, a steep or curvy road may be very risky at certain times of the day if the weather is sunny because the sun may shine directly into drivers' eyes as they drive along that road or section of road. Moreover, in some present invention embodiments, the attributes may be utilized to determine a driver-associated risk and a path risk, which may each be considered in order to determine the overall risk of a particular route. Each of these risk components (e.g. driver-associated risk and path risk) are described in further detail below with respect to FIGS. 3-6.

At step 208, the candidate routes are displayed on a map, such as a real-time map, together with a representation of the determined contextual risk. For example, the routes may be listed in a table or chart and ordered based, at least in part, on the determined contextual risk. Additionally or alternatively, the routes may be displayed on or over the roads of a real-time map one at a time (with the other routes hidden or grayed out) in an order based, at least in part, on the determined contextual risk. Still further, all of the candidate routes may be shown on or over the roads of a real-time map, with risk indicators included on each of the candidate routes. For example, each route may be color-coded (either the entire route or portions of each route) to indicate risk.

However, the display provided at step 208 is not only intended for driving navigation but also may be used for insurance determinations. For example, an insurance adjuster may view the maps regularly driven by a customer and compare the risks associated with these routes to risks associated with alternative routes when determining insurance rates. An example user interface displaying routes for an insurance adjuster is provided in FIG. 8 while an example user interface displaying routes for navigation is provided in FIG. 9. Each of these user interfaces is described in further detail below.

Figure 3:
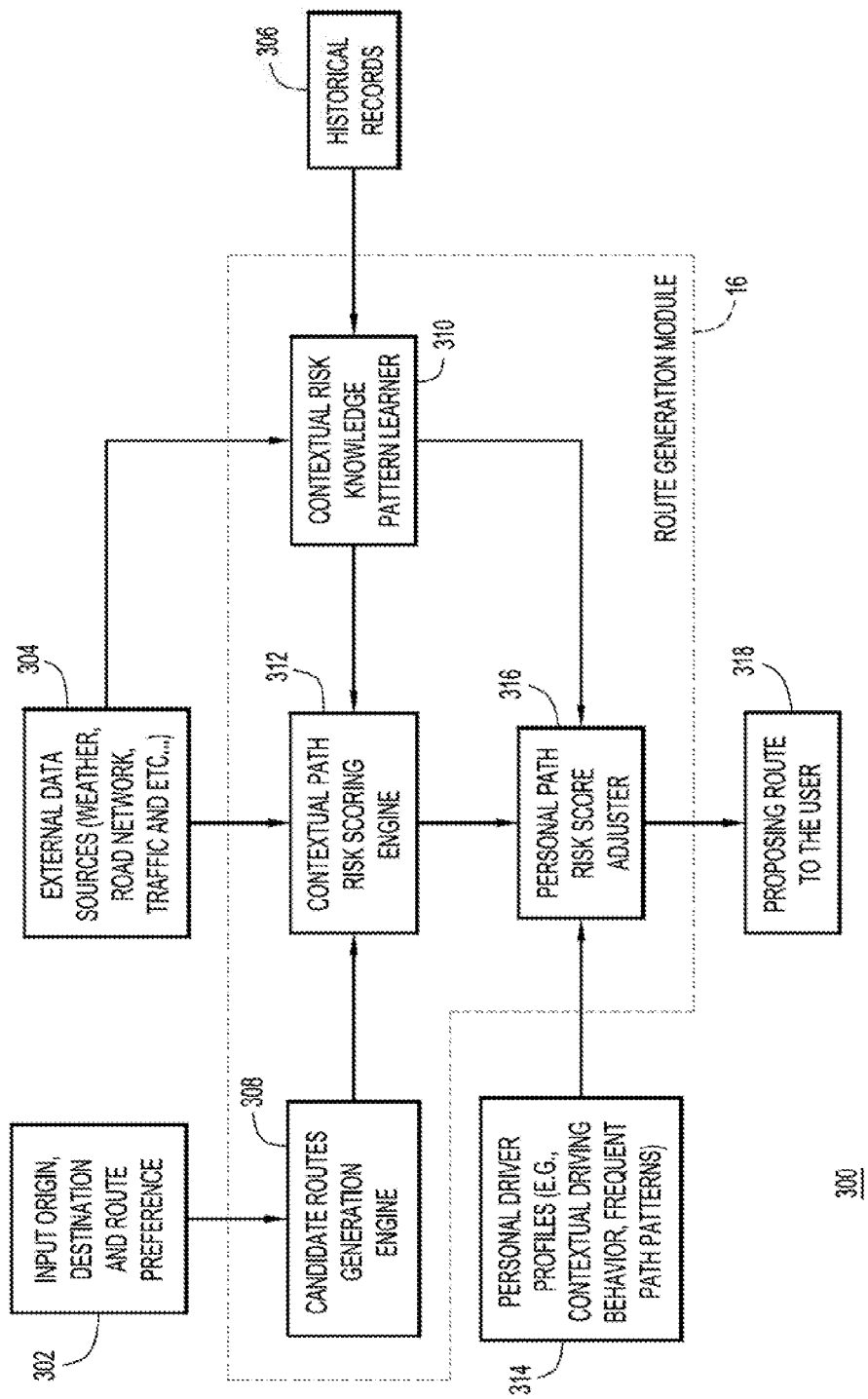
FIG. 3 is a block diagram depicting route generation based on contextual risk, according to one present invention embodiment.

FIG. 3 is a block diagram 300 depicting route generation operations based on contextual risk, according to one present invention embodiment. As shown, according to at least one present invention embodiment, the route generation module 16 may include a candidate route generation engine 308, a contextual path risk scoring engine 312, a contextual risk knowledge path learner 310, and a personal risk score adjuster 316. Together, these components can generate candidate routes, determine risk based on dynamic environmental attributes of a path, determine driver-associated risk, and propose routes to a user in the manner described above with respect to FIG. 2.

Moreover, the components of the route generation module 16 are configured to receive, determine and/or collect data from a variety of sources in order to make the risk determinations, route determinations, and other such determinations. The candidate routes generation engine 308 is configured to receive or determine an origin (e.g., the designated location), a destination, and/or a route preference (e.g., shortest distance) based on user input received at 302. In some instances, the candidate routes generation engine 308 may also receive or determine an origin location. Then, the candidate routes generation engine 308 may generate candidate routes between the origin and destination accordingly (e.g., based on received preferences for the fixed criteria).

The contextual path risk scoring engine 312 is configured to receive data from external data sources 304 relating to weather, traffic, government closures, etc., including realtime feeds and data stored in databases. The contextual risk knowledge pattern learner 310 is configured to access historical records 306 and communicate with the contextual path risk scoring engine 312. Consequently, the contextual risk knowledge pattern learner 310 may develop a history of risk for different routes and correlating different dynamic environmental attributes, such as time of day, weather condition, amount of traffic, etc. with different amount risks. Moreover, contextual risk knowledge pattern learner 310 may constantly update in view of the external data 304 processed by the contextual path risk scoring engine 312.

The personal path risk score adjuster 316 may receive and/or retrieve personal driver profiles. The personal driver profiles may be or include data retrieved from vehicle monitoring equipment, such as accelerometers and on-board computers included in a vehicle. The driver profiles may indicate or provide braking and acceleration patterns, such as the frequency of high impact braking or acceleration, as well as route data, such as the paths driven by a vehicle most frequently. The personal driver profiles may be stored in a database and updated over time in view of additional collected data. FIG. 7 illustrates a collection of data that may be utilized to build a personal driver profile and is discussed in further detail below.

As or after data is collected by the various components of the route generation module 16, the contextual risk scoring engine 312 may receive inputs from the candidate routes generation engine 308 (e.g., candidate routes based on shortest time) and the contextual risk knowledge pattern learner 310 (e.g., how risky each segment of the candidates routes are based on historical data and current dynamic environmental attributes). Then, each candidate route (from the candidate routes generation engine 308) may be scored with a risk (based on data from the contextual risk knowledge pattern learner 310 and current dynamic environmental attributes received from external data sources 304) in order to determine the risk of each of the candidate routes. In some embodiments, this risk determination may be supplemented by the personal path risk score adjuster 316 to consider specific traits, characteristics, or other such attributes of the specific driver that will be driving the route (e.g., bad eye sight, teenager, elderly, etc.). However, in other embodiments, the risk determination may not be supplemented by the personal path risk score adjuster 316 and the risk may be determined based solely on risk associated with the road (path risk) and dynamic environmental attributes. Regardless, once the risk of candidate routes is determined, the routes are proposed to the user (e.g. via a GUI) at 318.

FIG. 4 is a procedural flow chart illustrating a present invention embodiment of determining contextual risk (e.g. by the route contextual path risk scoring engine 312 of the route generation module 16). The risk determination is initiated when a path or route is received (e.g., from the candidate routes generation engine 308) at step 402. The route is initially assigned an overall risk score of 0 at step 404. Then, at step 406, the route is broken into a number of segments or links (L). The number of links may be any number greater than one and the number of links in a specific route may be determined in any desirable manner. For example, in some embodiments, a route may be broken into a number of links equivalent to a number of steps included the route (e.g., each street or road taken may comprise a link). Alternatively, a route may be broken into links according to length (e.g., by mile or kilometer (km)) or some combination of length and roads. For example, a mile of seven different side streets may be considered one link and 30 miles of highway may be considered another single link in a route. In some present invention embodiment, a route may be broken into links at mileage increments. Alternatively, a link may be limited to a maximum length of any desirable unit (e.g., miles or kms), provided the unit is used for all links in a route to provide consistency.

At step 408, a determination is made as to whether the route includes any links that have not been assigned a risk score (e.g., does a next link exist in the route). If another link in the route exists (e.g., a link does not have a risk score), a risk score will be determined for the next link at step 410 (e.g., L is not null). In order to determine a risk score dynamic environmental attributes of the link (e.g., current weather on the link, current traffic, location of sun at this time of day, etc.) are retrieved or received for the particular link at step 412 from external data sources 304.

At step 416, the retrieved dynamic environmental attributes of the link are used to compute a risk score or risk level at step 416. For example, snow may increase the risk level of the segment or link of the route by a certain number or percentage while a road with heavy congestion may increase the risk level of the segment or link of the route by another number or percentage. However, these scores may also be time dependent. The contextual risk knowledge pattern learner 310 may provide information that defines the relationships between the different dynamic environmental attributes and may also indicate how the current attributes affected the route at a previous time at step 416. Accordingly, the contextual risk knowledge pattern learner 310 with the dynamic environmental attributes at step 416 determines the risk level of the particular combination of contextual data (dynamic environmental attributes).

At step 420, the risk of the link is multiplied by the length of the link in order to give the risk score an appropriate weight. For example, if a route segment (a link) is given a risk score of 85 but is only 0.1 km long, step 420 will produce a score of 8.5 for this segment. At step 422, the overall risk score (e.g., the route risk score) is adjusted with the score of the link (e.g., the link score is added to the overall score). Then, this series of steps is repeated until all of the links in a particular route have been evaluated (e.g., L=null) in order to return the risk score for the route at step 424.

FIG. 5 is a procedural flow chart 500 illustrating a present invention embodiment of determining path risk (e.g., by the contextual risk knowledge pattern learner 310) based on historical accidents. However, while FIG. 5 only depicts operations for determining risk based on accidents, it is to be understood that the same or similar operations may be used to determine risk based on other factors, such as weather or traffic. Generally, the route generation module 16 leverages machine learning technologies (e.g., support vector machines or networks) to learn the knowledge patterns (e.g., the importance and/or weight of different contextual factors) to support the path risk scoring (as well as any driver-associated risk determinations made by the person path risk score adjuster 316). Consequently, over time, the dynamic environmental attributes may be weighted based on the risk of a path for a particular user.

In the specific example depicted in FIG. 5, a path risk determination is initiated when a historical accident list (HAL) is received or retrieved at step 502. Upon initiation, a hash map is generated at step 504. Then, accidents (A) are retrieved from the historical accident list (HAL) at steps 506 and 508, provided that the HAL includes a next accident (A) (e.g., A is not null). Each time an accident is retrieved from the HAL, dynamic environmental attributes of the accident are retrieved (e.g., by querying the context vector of the accident) at step 510 in order to correlate the accident with its specific dynamic environmental attributes in the hash map. Then, at step 520, the accident is added to the hash map together with the dynamic environmental attributes retrieved for that particular hash map. This sequence is repeated until all of the accidents from the HAL are considered.

Once the hash map is generated and populated with the accidents from the HAL, the hash map may be queried based on a generated route. Initially, at step 512, the route is plotted against the populated hash map (e.g., the hash map that includes the accidents and dynamic environmental attributes). Then, at step 514 a level of risk is determined for the route based on the hash map. In some present invention embodiments, if a specific data point is not included in the hash map, the data point may be estimated based on similar and/or surrounding data points. Similarly, in some present invention embodiments, the hash map may have multiple counts for different features, such as the number of fatal accidents, the number of minor accidents, and the total number of accidents. As a simple example, in some present invention embodiments, the number of total accidents is mapped to the route and counted at step 514. Then, the number of accidents is correlated to a certain risk level, such as by a tabular relationship.

For example, if a certain segment has between 0 and 1 accident, it may be assigned a risk level of 0. If the segment has between 2 and 10 accidents, it may be assigned a risk level of 1. If the segment has between 11 and 50 accidents, it may be assigned a risk level of 2. If the segment has between 51 and 100 accidents, it may be assigned a risk level of 3. If the segment has between 101 and 1000 accidents, it may be assigned a risk level of 4. Finally, if the segment has greater than 1001 accidents, it may be assigned a risk level of 5. In other embodiments where attributes may not be countable (e.g., weather-related attributes), the properties included in the hash map may simply be associated with a certain level of risk. For example, snow may be associated with a risk level of 3-5, depending on the rate of snowfall, rain may be associated with a risk level of 2-4, depending on the rate of rainfall and ice may be associated with a risk level of 5. However, in other present invention embodiments, risk scores or levels may be associated with dynamic environmental attributes in any desirable manner. At step 516 the risk level (e.g., 1-5) is returned for a particular segment (e.g., link) or route and the hash map is updated at step 520.

Now turning to FIG. 6, a procedural flow chart 600 illustrating a present invention embodiment of determining a risk associated with a driver (e.g. by the personal path risk score adjuster 316) is illustrated. As mentioned above, generally, the route generation module 16 leverages machine learning technologies (e.g., support vector machines or networks) to learn the knowledge patterns (e.g., the importance and/or weight of different contextual factors) to support the driver-associated risk scoring. Consequently, over time, the dynamic environmental attributes may be weighted based on user history.

In the specific example depicted in FIG. 6, a driver-associated risk determination is initiated when a driver profile (DP) is received or retrieved together with a path (P) and a risk score at step 602. The driver profile may indicate various characteristics or attributes of the driver, such as a penchant for hard breaking, a penchant for quick acceleration or high speeds, poor eye sight, slow reaction time, poor night vision, etc. Moreover, in some embodiments, the driver profile may simply indicate that the driver belongs to a particular class of drivers that is typically associated with a number of characteristics. For example, if the driver profile indicates that the driver is elderly, this may be understood to indicate a likelihood of poor vision, slow reaction time, and/or a preference for not driving at night. Similarly, if the driver profile indicates that the driver is a teenager, this may be understood to indicate a new driver whose exposure to high risk roads, high congestion, or adverse weather conditions should be minimized (either for the driver's safety or at the teenager's parents' desire).

Once a driver profile is received at step 602, links (L) of a route are retrieved until a full route is traversed (e.g., until L=null) at steps 606 and 608. Each time a link is retrieved, context data for that link is retrieved (e.g. the dynamic environmental attributes of that link at the appropriate time) at step 610 and a behavior factor is determined at step 612. Initially (prior to any links being considered), the behavior factor is set to 1. Then, as behavior factors are determined for each link, the behavior factor for the route is adjusted accordingly. In order to determine the behavior factor, the driver profile may be queried in view of the dynamic environmental attributes. For example, if a driver profile indicates a dislike for driving in snow and it is currently snowing, the behavior factor may be adjusted (e.g., increased) to reflect a higher risk for driving during the current snow. Each link in the route is evaluated at 610 and 612 until an entire route has been traversed and a behavior factor for the route is determined (e.g., the behavior factor has been adjusted by the behavior link of every link).

In some embodiments, different risk scores may be assigned to different attributes included in the driver profile and these risk scores may determine how to adjust the behavior score. For example, if the driver profile indicates that the driver is not a safe driver at night, a risk score of 5 may be assigned to this attribute and the behavior factor may be increased by 5 for each segment planned to be driven at night (or alternatively, 5/X may be added to the behavior factor for each segment driven at night, where X is the number of links or segments). By comparison, if the driver profile indicates that the driver is safe or has a tendency to avoid certain conditions, a smaller or zero risk score may be associated with this attribute and, thus, the behavior factor may only be slightly increased or left unchanged when current conditions match this attribute. For example, if a driver never drives at night, a segment for planned at night may only increase the behavior factor by 1 (or 1/X for each segment). Notably, if a driver has not driven at night, the behavior factor may only be adjusted incrementally because there is no indication of risk or safety, simply an indication of avoidance. Meanwhile if a driver has proven to be safe at night, the risk score for night may be 0 and the behavior factor may be left unadjusted. However, in other embodiments, the behavior factor may be adjusted in any desirable manner based on attributes or indications included in the driver profile.

Once a behavior factor is determined for a route, a matching degree is determined at step 614 based on the frequency with which the driver profile traverses the route. The matching degree is the percentage of the route (the path, P) that is covered by the driving profile's existing frequent paths (e.g., a value between 0 and 1 corresponding to a percentage). In some embodiments, a driver profile's frequent paths may be roads that are driven by the driver more than once a month, roads that are drive more than once a week, and/or roads within a certain mile radius of the driver's home. However, in other embodiments, frequency may be indicated by any measure that would be likely to correctly indicate roads with which a driver is familiar, since familiarity with a road may exponentially increase the safety of a road for a driver (the driver is not observing the new surroundings or looking for signs, intersections, etc.).

At step 616, the matching degree is weighted to generate a route factor. This weighting minimizes the effect of the matching degree while still allotting the matching degree a significant impact. Then, at step 618, the route factor can be multiplied with the behavior factor for the route in order to determine a driver-associated risk for a particular risk. When this driver-associated risk is determined, it may be multiplied by the risk score from the path risk (e.g. the risk determined in the steps from FIG. 5, described above) in order to determine the contextual risk for a route. However, it is to be understood that in some embodiments the driver-associated risk score need not be determined in order to determine the contextual risk for a route. Instead, the contextual risk may be comprised of only the path risk (e.g., the risk determined using the steps of FIG. 5).

Now referring to FIG. 7, a table 700 illustrating sample data used to determine a driver profile, according to one present invention embodiment is shown. The table includes a traffic indicator column 702, a time region column 704, a road type column 706, a mileage total column 708, an overspeed per 100 miles column 710 (indicating the amount of miles per 100 miles that are driven above the speed limit), a hash brake per 100 miles column 712 (indicating the amount of miles per 100 miles that are driven while braking), and an anxious acceleration per 100 miles column 714 (indicating the amount of miles per 100 miles that are driven with excessive or quick acceleration). Each of the per 100 categories may indicate a level of risk, where higher numbers indicate a higher risk since higher numbers indicate more braking, acceleration, or speeding, each of which is likely to cause collisions. For example, at 722, the numbers are very low, indicating low risk. At 720, the numbers are higher indicating medium risk, and at 724, the numbers are the highest, indicating a high risk.

In order to determine a driver profile, this data can be averaged for different contextual settings that may indicate whether a driver is a safer driver in different settings. For example, in some embodiments day time speeding, braking, and acceleration tendencies may be compared to night time speeding, braking, and acceleration tendencies. If night tendencies indicate a propensity for risk, the driver profile may be adjusted to have a preference for day time driving. Similarly, if speeding, braking, and acceleration tendencies indicated the driver is safer on city streets than on a highway, the driver profile may be adjusted to reflect this characteristic and then routes with more city streets may be preferred to routes with more highway driving, if possible. Additionally or alternatively, the driver profile information may simply indicate a likelihood to drive in certain conditions and, thus, may indicate a tolerance level of risk for a specific user. However, in other embodiments, the data retrieved from vehicle tracking may be used in any desirable manner to develop a driver profile.

Figure 8:
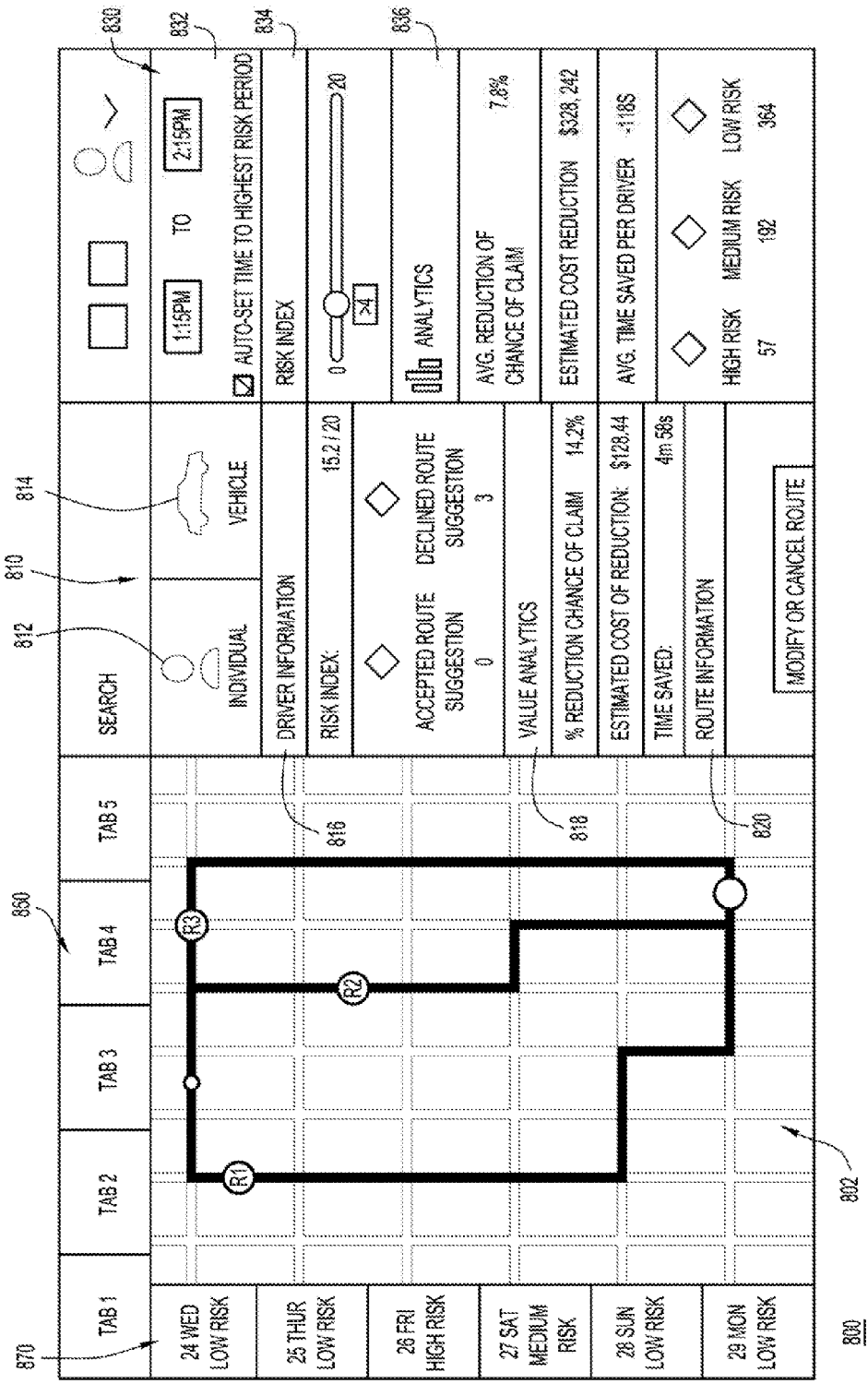
FIG. 8 depicts an example user interface that leverages contextual risk determinations for insurance determinations, according to a present invention embodiment.

Now referring to FIGS. 8 and 9, example user interfaces 800 and 900 displaying routes including contextual risk according to present invention embodiments are illustrated. In FIG. 8, the routes are displayed in the context of an insurance adjuster, but still include indications (in the form of color-coding) of risk on the map. By comparison, in FIG. 9, the routes are displayed on a map 902 in the context of navigation with a listing 910 that includes risk scores. The display shown in FIG. 8 also includes insurance information that reflects how the different routes may impact insurance rates while the display in FIG. 9 simply illustrates navigational information, such as time, distance, risk, and conditions.

In FIG. 8, the insurance adjuster interface 800 includes a map 802, a individual driver pane 810, a group pane 830, tabs 850 that may allow different views of the map 802 (such as weather views) and a calendar 870. The individual driver pane 810 includes information section 816 with icons for the driver and their car at 812 and 814, respectively. Each of these icons may be selected in order to change the driver or vehicle for a particular scenario. The driver pane 810 also includes a value analytics section 818 which may indicate the risk index for a particular driver. The risk index may indicate the amount of risk associated with the roads that a particular driver has been driving on. For example, the risk index may indicate the average risk associated with the roads driven by the driver on a scale of 1 to 20. The value analytics section 818 may also indicate the number of route suggestions from the insurance company which the driver has accepted or declined (perhaps as determined by vehicle tracking subsequent to an interaction). These features will assist insurance adjusters in determining what level of risk to assign to a driver when determining or adjusting a premium.

Still further, the driver pane 810 may include a route information section 820 that may indicate different route options available to a user in order to reduce the risk associated with the routes typically taken by the driver. In the particular example shown in FIG. 8, the map 802 includes routes R1, R2, and R3. The map also includes the number 57 over R1, indicating that the driver ("Kathy") has driven R1 57 times over the period of time being considered. However, R1 is also indicated to be the associated with a high level of risk (colored red), R2 is indicated to be associated with a medium level of risk (colored green) and R3 indicated to be is associated with a low level of risk (colored blue). Consequently, the adjuster may suggest that Kathy begin to drive on routes R2 and R3 instead of route R1.

In order to help the adjuster convince Kathy to make this change, the route information section 820 may include statistics, such as the chance of reducing a claim by switching routes, the cost associated with that chance, and the incremental time increase associated with that change. However, in other embodiments, this pane may be configured in any desired manner to allow an insurance professional to leverage information to adjust rates for a driver based on the route choices made by that driver and correctly assign higher rates to drivers who regularly choose risky routes and lower rates to drivers who regularly choose safe routes. These features are important for customer retention as it allows insurance professionals to offer concrete suggestions on how to lower a rate. Additionally, the level of tracking provided by the contextual route determination may further increase the accuracy and efficiency of pay-as-you-drive insurance programs.

The group pane 830 may also assist in making insurance determinations as it may provide a comparison of the driver at issue (e.g., Kathy) to other drivers in his or her group. The group pane includes a time input 832, a risk index 834, and an analytics section 836. The risk index 834 may allow a tolerance for risk to be adjusted for a particular risk tolerance (e.g., based on the insurance companies policies) and the analytics section 836 may allow a user to focus or expand upon the analytics included in value analytics section 818, perhaps by comparing a driver to the rest of a group.

The time input 832 allows a user (e.g., the insurance adjuster) to view route candidates and the associated risk between an origin and destination at different times of the day. Alternatively, the time may be set to the riskiest time in order to view the worst possible conditions. Similar to this feature, the calendar 870 (included opposite the group pane 830) may indicate the risk of the selected routes on different days. For example, certain routes may be riskier during weekdays if the routes are frequented by commuters while certain routes may be riskier during weekends if the routes are frequented by tourists or the routes are expected to be crowded in view of an upcoming event, such as a sporting event, a parade, a race, or some other event that typically impacts traffic patterns.

Now referring to FIG. 9, the user interface includes a real-time map 902, a route table 910, a risk level key 930, and an information inset 940. The route table 910 includes route numbers 912, risk scores 914, distances 916, and route times 918. The route numbers 912 correlate to route numbers included on routes shown on the map 902; however, in some embodiments, only some of the routes included in the route table 910 may be shown on the map 902 in order to remove clutter from the map 902. As an example, only routes R1 and R2 are shown in map 902. However, a user may easily select any of the routes in the table 910 in order to have the route shown in the map 902. For example, a user may touch a particular route in order to have that route displayed for navigation. By including a number of metrics, such as risk score, distance, and time, the user may choose which metric is most important to him or her. However, when generating the table 910, the risk score may be considered as a primary factor together with other factors such as trip distance, time, road characteristics, in order to determine the sequencing of proposed potential routes for the user in the table 910.

In order to provide additional information to a user, context considered in making a risk determination may be shown to a user in inset 940 and a risk key may be included in key 930, so that the map 902 can be color coded to provide a visualization of the risk on the map 902. For example, the context inset 940 may include information relating to weather (e.g., its snowing on this route), traffic (e.g., traffic is fluent), road type (e.g. freeway), road condition (e.g., bad), time period (e.g., evening), and hot spot level (e.g., sever). As an example of color-coding, risky sections may be coded red and safe sections may be coded blue, while risks therebetween are colored with other colors and all of these colors may be shown in the key 930.

It will be appreciated that the embodiments described above and illustrated in the drawings represent only a few of the many ways of implementing embodiments for generating routes based on contextual risk.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, route generation module, etc.). These systems may include any types of monitors and input devices (e.g., keyboard, mouse, voice recognition, etc.) to enter and/or view information. The communication with drivers would be both visual and audio so that drivers do not have to focus their attention on the navigational risk screen.

It is to be understood that the software (e.g., route generation module 16) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., route generation module 16) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., route history, driver profiles, etc.). The database system may be implemented by any number of any conventional or other databases, data stores or storage structures (e.g., files, databases, data structures, data or other repositories, etc.) to store information (e.g., route history, driver profiles, etc.). The database system may be included within or coupled to the server and/or client systems. The database systems and/or storage structures may be remote from or local to the computer or other processing systems, and may store any desired data (e.g., route history, driver profiles, etc.).

The present invention embodiments may employ any number of any type of user interface (e.g., Graphical User Interface (GUI), command-line, prompt, etc.) for obtaining or providing information (e.g., a destination, origin, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touchscreen, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining routes based on contextual risk comprising:
   generating, at a mobile device comprising a global positioning system (GPS) receiver, a processor, a network interface, and a display, candidate routes from a designated location to a destination based on available roadways and one or more fixed criteria;
   determining a driver-associated risk for each of the candidate routes by weighting a behavior factor for a driver profile based on a frequency with which a user requesting the candidate routes traverses the candidate routes;
   determining a contextual risk associated with each of the candidate routes based on at least dynamic environmental attributes that are retrieved from an external data source and weighted based on the driver-associated risk; and
   displaying, on the display of the mobile device, the candidate routes on a map together with a representation of the determined contextual risk.

2. The method of claim 1, wherein the designated location is a current location determined by the GPS receiver and the fixed criteria includes at least one criteria selected from the group of driving time, distance, maximum highway driving, and minimum highway driving.

3. The method of claim 1, wherein determining the contextual risk further comprises:
   determining a path risk based on at least the dynamic environmental attributes.

4. The method of claim 1, wherein the dynamic environmental attributes relate to at least one subject selected from the group of: weather, traffic, road type, road condition, time period, and hot spot level.

5. The method of claim 1, wherein the driver profile includes at least one attribute selected from the group of: contextual driving behavior, frequent path patterns, and historical accident records.

6. The method of claim 1, wherein determining the contextual risk further comprises:
   splitting each candidate route into two or more route segments;
   determining a contextual risk associated with each of the two or more route segments based on at least dynamic environmental attributes of the specific route segments; and
   aggregating the contextual risk associated with each of the two or more route segments of each candidate route to determine a contextual risk associated with each of the candidate routes.

7. A navigation system comprising:
   a global positioning system (GPS) receiver;
   a network interface;
   a processor configured to:
      generate candidate routes from a designated location to a destination based on available roadways and one or more fixed criteria;
      determine a driver-associated risk for each of the candidate routes by weighting a behavior factor for a driver profile based on a frequency with which a user requesting the candidate routes traverses the candidate routes; and
      determine a contextual risk associated with each of the candidate routes based on at least dynamic environmental attributes that are retrieved from an external data source and weighted based on the driver-associated risk; and
   a display configured to display the candidate routes on a map together with a representation of the determined contextual risk.

8. The navigation system of claim 7, wherein the designated location is a current location of the navigation system determined by the GPS receiver and the fixed criteria includes at least one criteria selected from the group of driving time, distance, maximum highway driving, and minimum highway driving.

9. The navigation system of claim 7, wherein in determining the contextual risk, the processor is further configured to:
determine a path risk based on at least the dynamic environmental attributes.

10. The navigation system of claim 7, wherein the dynamic environmental attributes relate to at least one subject selected from the group of: weather, traffic, road type, road condition, time period, and hot spot level.

11. The navigation system of claim 7, wherein the driver profile includes at least one attribute selected from the group of: contextual driving behavior, frequent path patterns, and historical accident records.

12. The navigation system of claim 7, wherein in determining the contextual risk, the processor is further configured to:
split each candidate route into two or more route segments;
determine a contextual risk associated with each of the two or more route segments based on at least dynamic environmental attributes of the specific route segments; and
aggregate the contextual risk associated with each of the two or more route segments of each candidate route to determine a contextual risk associated with each of the candidate routes.

13. A computer program product for determining routes based on contextual risk, the computer program product comprising a computer readable storage medium having program instructions embodied therewith, the program instructions executable by a processor of a mobile device comprising a global positioning system (GPS) receiver, a network interface, and a display, to cause the processor to:
generate candidate routes from a designated location to a destination based on available roadways and one or more fixed criteria;
determine a driver-associated risk for each of the candidate routes by weighting a behavior factor for a driver profile based on a frequency with which a user requesting the candidate routes traverses the candidate routes
determine a contextual risk associated with each of the candidate routes based on at least dynamic environmental attributes that are retrieved from an external data source and weighted based on the driver-associated risk; and
display, on the display of the mobile device, the candidate routes on a map together with a representation of the determined contextual risk.

14. The computer program product of claim 13, wherein the designated location is a current location determined by the GPS receiver and the fixed criteria includes at least one criteria selected from the group of driving time, distance, maximum highway driving, and minimum highway driving.

15. The computer program product of claim 13, wherein the program instructions executable to cause the processor to determine the contextual risk further comprise instructions executable by a processor to cause the processor to:
determine a path risk based on at least the dynamic environmental attributes.

16. The computer program product of claim 13, wherein the dynamic environmental attributes relate to at least one subject selected from the group of: weather, traffic, road type, road condition, time period, and hot spot level.

17. The computer program product of claim 13, wherein the driver profile includes at least one attribute selected from the group of: contextual driving behavior, frequent path patterns, and historical accident records.

18. The computer program product of claim 13, wherein the program instructions executable to cause the processor to determine the contextual risk further comprise instructions executable by a processor to cause the processor to:
split each candidate route into two or more route segments;
determine a contextual risk associated with each of the two or more route segments based on at least dynamic environmental attributes of the specific route segments; and
aggregate the contextual risk associated with each of the two or more route segments of each candidate route to determine a contextual risk associated with each of the candidate routes.

* * * * *